United States Patent
Langhammer et al.

(10) Patent No.: US 12,020,000 B2
(45) Date of Patent: Jun. 25, 2024

(54) ROUNDING CIRCUITRY FOR FLOATING-POINT MANTISSAS

(71) Applicant: Intel Corporation, Santa Clara, CA (US)

(72) Inventors: Martin Langhammer, Alderbury (GB); Alexander Heinecke, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 669 days.

(21) Appl. No.: 17/133,861

(22) Filed: Dec. 24, 2020

(65) Prior Publication Data

US 2021/0117154 A1 Apr. 22, 2021

(51) Int. Cl.
*G06F 7/483* (2006.01)
*G06F 7/499* (2006.01)

(52) U.S. Cl.
CPC .......... *G06F 7/483* (2013.01); *G06F 7/49947* (2013.01)

(58) Field of Classification Search
CPC .............. G06F 7/483; G06F 7/49947
See application file for complete search history.

(56) References Cited

U.S. PATENT DOCUMENTS 5,548,544 A * 8/1996 Matheny ............. G06F 7/483
708/497
2018/0081631 A1* 3/2018 Langhammer ........ G06F 7/4876

\* cited by examiner

*Primary Examiner* — Andrew Caldwell
*Assistant Examiner* — Carlo Waje
(74) *Attorney, Agent, or Firm* — Akona IP PC (57) ABSTRACT

Systems and methods include arithmetic circuitry that generates a floating-point mantissa and includes a propagation network that calculates the floating-point mantissa based on input bits. The systems and methods also include rounding circuitry that rounds the floating-point mantissa. The rounding circuitry includes a multiplexer at a rounding location for the floating-point mantissa that selectively inputs a first input bit of the input bits or a rounding bit. The rounding circuitry also includes an OR gate that ORs a second input bit of the input bits with the rounding bit. Moreover, the second input bit is a less significant bit than the first input bit.

20 Claims, 8 Drawing Sheets

ROUNDING CIRCUITRY FOR FLOATING-POINT MANTISSAS

BACKGROUND

This disclosure relates to integrated circuits designed to perform floating-point arithmetic. More particularly, the present disclosure relates to utilizing flexible rounding points for floating-point mantissas.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Artificial intelligence (AI) is becoming an increasingly prevalent application area. Rounding circuitry implementations of floating-point operations for AI applications has emerged as an architectural bottleneck for both application-specific standard product (ASSP) and central processing unit (CPU) designs.

AI uses many different numbers (e.g., 8, 16, and 32) of bits in floating-point formats for storage and computation. However, at least some of the formats may use a common format when inner products are being computed. For example, the accumulation of the inner products may be performed using IEEE float32 to maintain high accuracy despite the level of accuracy used in the input and/or output of the neural network. AI, specifically deep learning, builds a multi-layer topology through which the data propagates. As the input to each operation is provided in one of the lower precision formats (e.g., float16), the accumulator result is down-converted after completion of the inner product to the corresponding target precision. This level of precision is used so that the rounded accumulator result can properly be fed to the next layer of the AI implementation (e.g., a neural network).

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It may be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it may be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

As discussed in further detail below, embodiments of the present disclosure relate generally to logic circuitry for rounding and/or calculating one or more mantissa rounding positions in systems that utilize more than one floating-point precision level. Such calculations may use multiple adders, but adders may be expensive in size and/or cost. In contrast, using modern design tools, carry propagate adders (CPAs) may be used to implement a combined adder that performs adding and rounding. However, circuitry utilizing CPAs and combined adders may become quite complex to implement multiple selectable rounding locations. As discussed herein, in conjunction with parallel prefix propagation circuits, rounding circuitry may enable the rounding start points in the mantissas to be freely controlled. Freely controlling the rounding start points in the mantissas may result in less delay in computation, as a parallel propagation circuit may begin calculation at a set rounding point (e.g., at a more significant bit), rather than performing the entirety of the rounding calculation.

Figure 1:
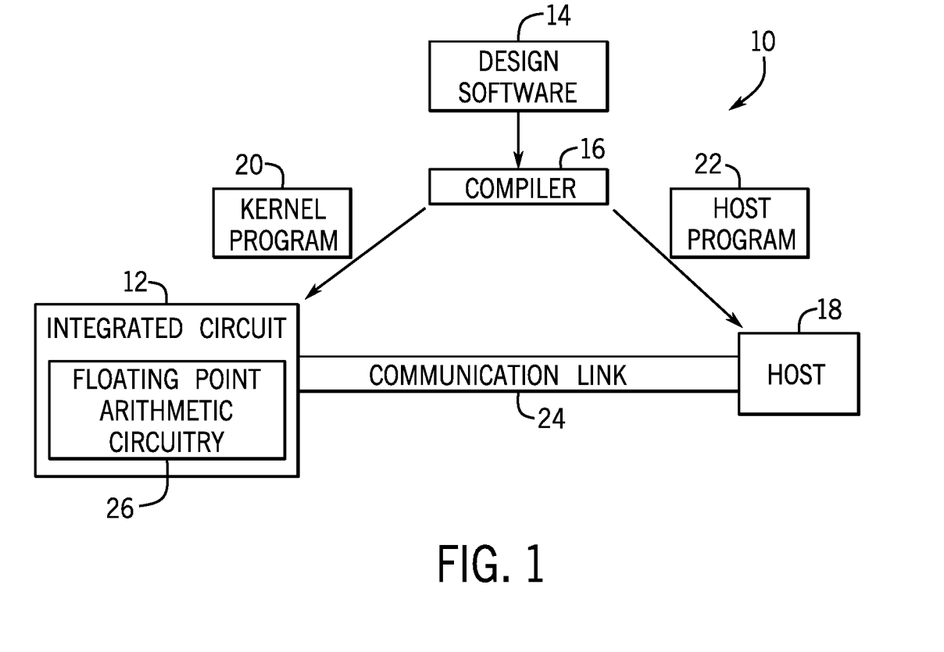
FIG. 1 is a block diagram of a system for implementing floating-point multiplier rounding, in accordance with an embodiment.

With the foregoing in mind, FIG. 1 illustrates a block diagram of a system 10 that may implement floating-point multiplier rounding. A designer may desire to implement functionality involving a number of rounding operations at various rounding positions on an integrated circuit device 12 (such as a field programmable gate array (FPGA)). The designer may specify a high-level program to be implemented, such as an OpenCL program, which may enable the designer to more efficiently and easily provide programming instructions to configure a set of programmable logic cells for the integrated circuit device 12 without requiring specific knowledge of low-level hardware description languages (e.g., Verilog or VHDL). For example, because OpenCL is quite similar to other high-level programming languages, such as C++, designers of programmable logic familiar with such programming languages may have a reduced learning curve than designers that may have to learn unfamiliar low-level hardware description languages to implement new functionalities in the integrated circuit device 12.

Designers may implement their high-level designs using design software 14. The design software 14 may use a compiler 16 to convert the high-level program into a lower-level description. The design software 14 may also be used to optimize and/or increase efficiency in the design. The compiler 16 may provide machine-readable instructions representative of the high-level program to a host 18 and the integrated circuit device 12. The host 18 may receive a host program 22, which may be implemented by kernel programs 20. To implement the host program 22, the host 18 may communicate instructions from the host program 22 to the integrated circuit device 12 via a communications link 24, which may be, for example, direct memory access (DMA) communications or peripheral component interconnect express (PCIe) communications. In some embodiments, the kernel programs 20 and the host 18 may enable configuration of floating-point arithmetic circuitry 26 on the integrated circuit device 12. The floating-point arithmetic circuitry 26 may include circuitry and/or other logic elements and may be configured to implement, for example, floating-point arithmetic logic and/or machine learning operations.

Figure 2:
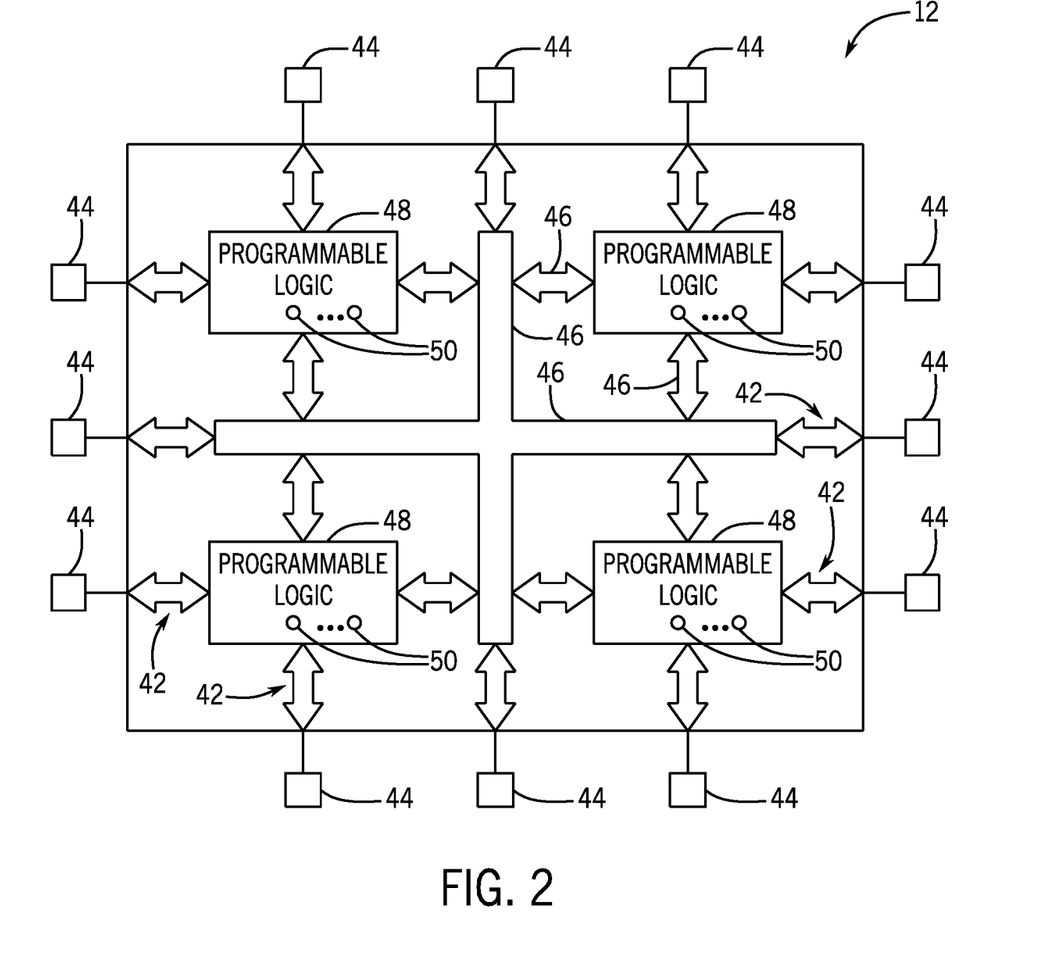
FIG. 2 is a block diagram of an integrated circuit device where multipliers may be implemented, in accordance with an embodiment.

Turning now to a more detailed discussion of the integrated circuit device 12, FIG. 2 illustrates a block diagram of the integrated circuit device 12 that may be a programmable logic device, such as an FPGA. Further, it should be understood that the integrated circuit device 12 may be any other suitable type of programmable logic device (e.g., an application-specific integrated circuit and/or application-specific standard product). As shown, the integrated circuit device 12 may have input/output circuitry 42 for driving signals off device and for receiving signals from other devices via input/output pins 44. Interconnection resources 46, such as global and local vertical and horizontal conductive lines and buses, may be used to route signals on integrated circuit device 12. Additionally, interconnection resources 46 may include fixed interconnects (conductive lines) and programmable interconnects (i.e., programmable connections between respective fixed interconnects). Programmable logic 48 may include combinational and sequential logic circuitry. For example, programmable logic 48 may include look-up tables, registers, and multiplexers. In various embodiments, the programmable logic 48 may be configured to perform a custom logic function. The programmable interconnects associated with interconnection resources may be considered to be a part of programmable logic 48. The programmable logic 48 may include multiple various types of programmable logic 48 of different tiers of programmability. For example, the programmable logic 48 may include various mathematical logic units, such as an arithmetic logic unit (ALU) or configurable logic block (CLB) that may be configured to perform various mathematical functions (e.g., floating-point multiplication calculations). Integrated circuits, such as integrated circuit device 12, may contain programmable elements 50 within the programmable logic 48. For example, a designer (e.g., a customer) may program (e.g., configure) the programmable logic 48 to perform one or more desired functions (e.g., perform floating-point arithmetic).

Figure 3:
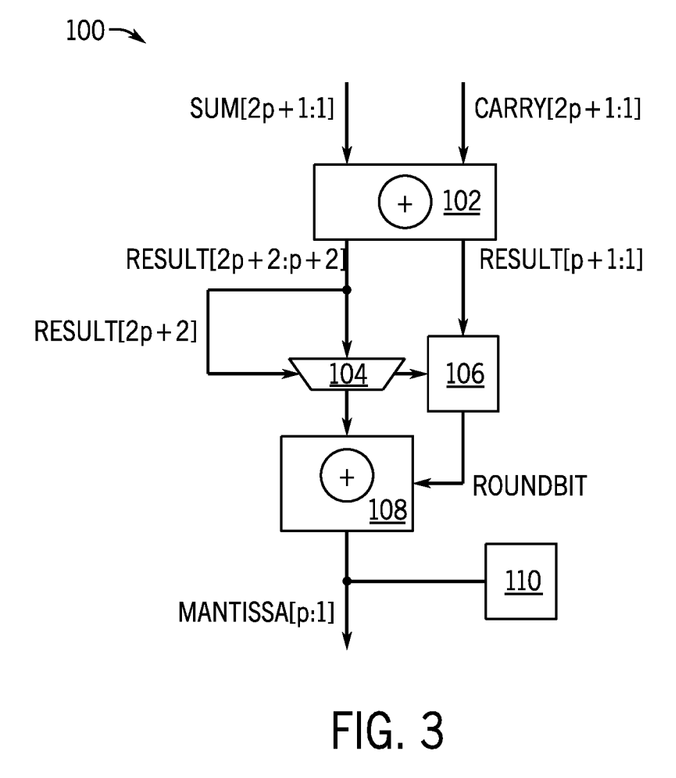
FIG. 3 is a block diagram of a floating-point multiplier for performing floating-point multiplication with rounding, in accordance with an embodiment.

Various mechanisms may be used to implement floating-point multiplication operations in hardened circuits that may be used in the programmable logic 48. FIG. 3 illustrates a block diagram of a floating-point multiplier 100 for performing floating-point multiplication with rounding. This embodiment may use carry propagate adder (CPA) 102 and rounding CPA 108. Certain embodiments for floating-point rounding include compound adders where the CPA 102 and the rounding CPA 108 may be replaced by a single structure that may calculate A+B and A+B+1 simultaneously. In some embodiments A+B+2 may be calculated as well. This may result in a more efficient structure than two separate addition operations.

Certain methods for integer multiplication may be used to form the mantissa multiplication of the floating-point multiplier 100. Floating-point multipliers may include a partial product generator that creates multiple partial products, an N-2 compressor that adds the various partial products together in a redundant form with two output vectors, and a CPA that adds the two vectors together.

Furthermore, FIG. 3 illustrates the individual steps of floating-point multiplication and rounding in a floating-point multiplier 100. The floating-point multiplier 100 takes in two mantissas of precision p. These mantissas have an implied leading 1, so the result of the multiplier may be actually 2p+2 bits wide. The value of the inputs therefore is 1.X and 1.Y. Thus, the product will be in two possible ranges: from 1.0 to $1.99\overline{9}$ and from 2.0 to $3.99\overline{9}$. The output may be normalized to ensure that the result is in the range 1.0 to $1.99\overline{9}$. This normalization may be accomplished by inspecting the values of one or more most significant bits and right-shifting by a number (e.g., 1) of bits using a normalization multiplexer 104. In other words, the normalization multiplexer 104 may be used to normalize the number to a correct location (while also causing a corresponding change in an exponent of the number). The lower bits of the multiplier output, combined with the normalize condition, may define the value of the round bit. The round bit may then be added to the mantissa in rounding CPA 108. If the normalized value of the output is 1.999, there may be an overflow to 2.0. In this case, the value of the exponent may be increased by 1. As can be seen from FIG. 3, this method for pedantic floating-point multiplier rounding results in a longer critical path. In the critical path, first the "Sum" and "Carry" bits are input to the first CPA 102. Then, outputs from the CPA 102 are output to the normalization multiplexer 104 and a rounding circuit 106. The outputs from the normalization multiplexer 104 and the rounding circuit 106 are then output to the rounding CPA 108. The rounding CPA 108 outputs the mantissa value and any carry bit will be output to component 110. The floating-point multiplier 100 will generate the correct result but may not be the most effective choice for use in an application specific integrated circuit (ASIC). The floating-point multiplier 100 may be unsuitable for ASICs due to CPAs taking up substantial space on the integrated circuit device 12, may be expensive, and may be less efficient than alternative implementations. In certain ASIC floating-point multiplier architectures, the rounding circuit 106 may be combined with the rounding CPA 108.

Figure 4:
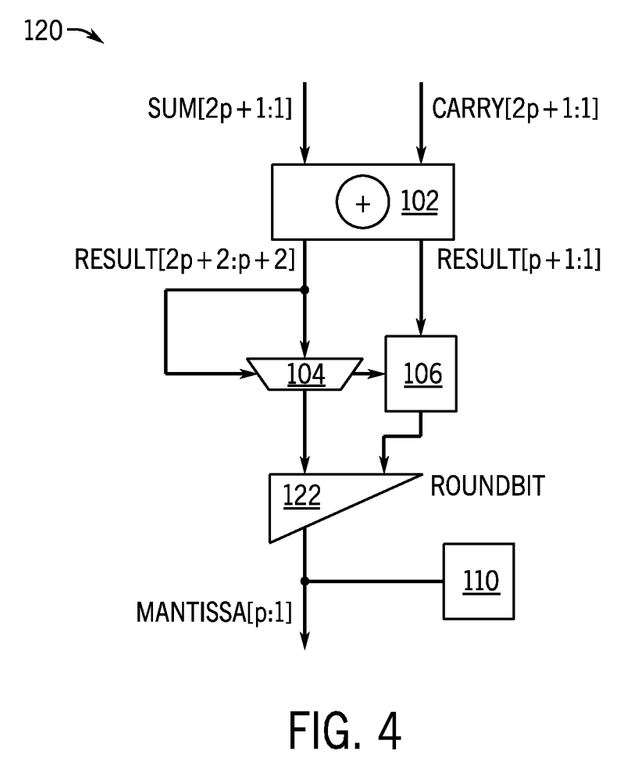
FIG. 4 is a block diagram of a floating-point multiplier that is another embodiment of the floating-point multiplier of FIG. 3, in accordance with an embodiment.

FIG. 4 illustrates a block diagram of a floating-point multiplier 120 that is an alternative embodiment of the floating-point multiplier 100 described in FIG. 3. Primarily, the rounding CPA 108 in FIG. 3 may be replaced with a parallel prefix propagation circuit 122. The parallel prefix propagation circuit 122 is a structure where every output may be the bitwise AND of inputs before its position. The output of the ANDing of the inputs may then be subsequently ANDed with the round bit. The parallel prefix propagation circuit 122 may be efficiently implemented in parallel with any suitable prefix topology, such as Brent-Kung, Ladner-Fischer, or another suitable prefix topology. The output of the parallel prefix propagation circuit 122 may then be XORed with the output bits of the normalization multiplexer 104. The most significant bit output of the parallel prefix propagation circuit 122 will indicate an overflow. The advantage of replacing the rounding CPA 108 with the parallel prefix propagation circuit 122 is that the size and simplicity of the parallel prefix propagation circuit 122 is such that it conserves space and reduces latency in the floating-point multiplier 120.

One technological aspect that allows the disclosed improvements to the state of the art is the improvement in synthesis tools and design software, such as those described in FIG. 1. Previously, circuit designers had to specify a gate-by-gate implementation of a combined floating-point round or CPA circuit. Electronic Design Automation (EDA) tools have improved to the point where there is a library of published arithmetic topologies, and the EDA tools can evaluate a large number of approaches quickly, including the impact of a compressor on a CPA architecture. Consequently, building a floating-point multiplier where a CPA is behaviorally specified may create a smaller circuit size than a circuit implemented using the floating-point multipliers 100 and 120. The cost of the additional elements to build the rounding implementation of FIG. 4 (i.e., the parallel prefix propagation circuit 122) is smaller than the explicitly defined counterpart (i.e., the rounding CPA 108) shown in FIG. 3.

Figure 5:
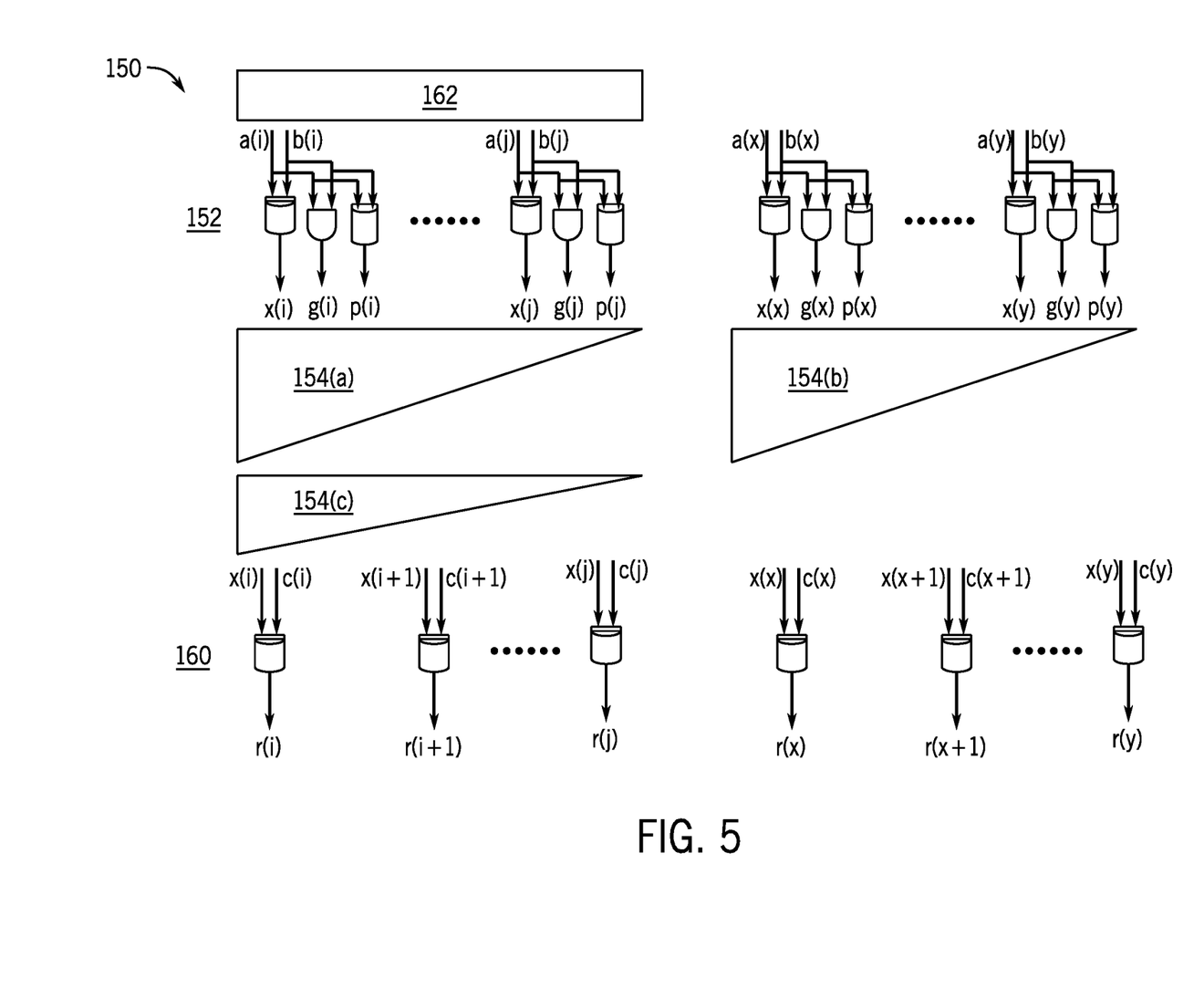
FIG. 5 is a block diagram of a mixed integer and floating-point multiplier, in accordance with an embodiment.

FIG. 5 shows a simplified block diagram of a mixed integer and floating-point multiplier 150 with parallel prefix adders 154. First, circuit 152 computes the partial products for the vector x(i), the generate vector g(i), and the propagate vector p(i). Two input vectors a(i) and b(i) may be: (1) bitwise XORed resulting in the vector x(i), (2) bitwise ANDed resulting in the generate vector g(i), and (3) bitwise ORed resulting in the propagate vector p(i). The generate vector g(i) and the propagate vector p(i) may then be input into the parallel prefix adders 154, which output the carry vector c(i). The vectors x(i) and c(i) may then be input into an XOR gate 160 to produce the result vector r(i). A variety of prefix topologies (e.g., a Brent-Kung or Ladner-Fischer network) may be used to implement the parallel prefix adders 154.

The mixed integer and floating-point multiplier 150 may be more complex than is shown and may result in increased space consumed on and latency in the integrated circuit device 12. Recall from FIG. 3 that the floating-point mantissa is in the upper portion of the CPA 102, and that the rounding CPA 108 is used only for rounding determinations. Thus, the vector in FIG. 5 is split into two halves, and each may be added together via the parallel prefix adders 154a and 154b. As the mixed integer and floating-point multiplier 150 may be reused for integer multiplication, the entirety of the output may be used. Thus, the parallel prefix adder 154c may be added to optionally combine the outputs of the parallel prefix adders 154a and 154b. As a result, the mantissa may range from 2.0 to 3.999. To accommodate this range, a half-adder layer 162 may be used to insert an additional space in the least significant bit of the mantissa location. This insertion of the additional space enables the mixed integer and floating-point multiplier 150 to inject the round at either position 0 or position 1.

Adding additional rounding locations may be difficult to implement in systems such as the mixed integer and floating-point multiplier 150 illustrated in FIG. 5. To add additional rounding locations, the mixed integer and floating-point multiplier 150 may utilize adding additional parallel prefix adders 154 and reformatting their positions in the mixed integer and floating-point multiplier 150, potentially increasing the complexity of the mixed integer and floating-point multiplier 150. In contrast, FIG. 6 describes a floating-point multiplier 200 that may be used to more efficiently add additional rounding locations than the mixed integer and floating-point multiplier 150 of FIG. 5. For instance, the floating-point multiplier 200 may omit the half-adder layer 162 while providing rounding points at multiple locations.

Figure 6:
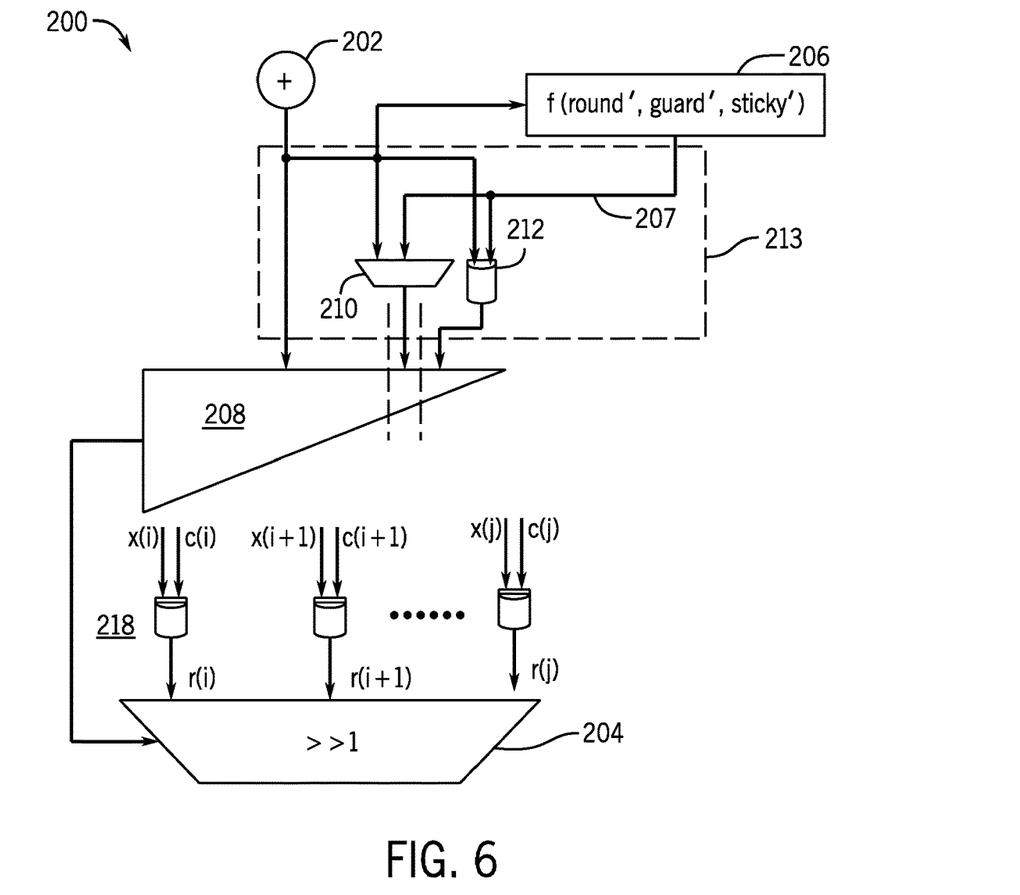
FIG. 6 is a block diagram of a floating-point multiplier, in accordance with an embodiment.

As previously stated, the CPA 102 and the rounding CPA 108 illustrated in FIG. 3 may be replaced by a single structure that may be more efficient than a structure where multiple addition operations are carried out separately. FIG. 6 illustrates a simplified block diagram of an embodiment of a floating-point multiplier 200 where the floating-point multiplier 200 represents a structure that can efficiently implement multiple addition operations while keeping the operations separate. This may result in simpler design code base that is more maintainable and verifiable.

A CPA circuit 202 in FIG. 6 may be explicitly defined or behaviorally specified using EDA tools. The CPA circuit 202 drives a processing circuit 206, a rounding circuit 213, and a propagation network 208. The processing circuit 206 generates a rounding bit 207 using outputs from the CPA circuit 202 and/or other control signals. The rounding circuit 213 includes a rounding multiplexer 210 that is configured to output the rounding bit 207 or the corresponding bit from the CPA circuit 202 to the propagation network 208 at the rounding location. One or more OR gates 212 may also be included in the floating-point multiplier 200 to drive one or more bits (e.g., propagate bits) to the right of the rounding location in the propagation network 208 to a logic value (e.g., high). Forcing the one or more bits to the right of the rounding location high may cause the floating-point multiplier 200 to behave as if calculations in the propagation network 208 started where the rounding is injected. In other words, driving these bits high may move some parts of the floating-point multiplier 200 (e.g., the normalization multiplexer 204) out of the critical path.

In the floating-point multiplier 200, the most significant bit output of the propagation network 208 drives both the normalization multiplexer 204 and exponent adjustment, followed by exception handling. The mantissa value may not be used until the exception handling is complete. The exception handling may take place outside of the floating-point multiplier 200 but within the integrated circuit device 12 (e.g., by a specified function within programmable logic 48) and/or may be handled in the floating-point multiplier 200 using circuitry omitted from the drawings for simplicity. The normalization multiplexer 204 occurs after the XORs 218. The XORs 218 may apply carry values from the propagation network 208 to a value that is then multiplexed by normalization multiplexer 204.

The propagation network 208 may be behaviorally specified by design software such as an EDA tool. Explicitly defined circuitry may be large and complex. This may result in the circuitry being more prone to bugs, more space being consumed on the integrated circuit device 12, and increased latency and power consumption. Behaviorally specifying circuits instead may result in a simplified circuit that is easier to verify.

Figure 7:
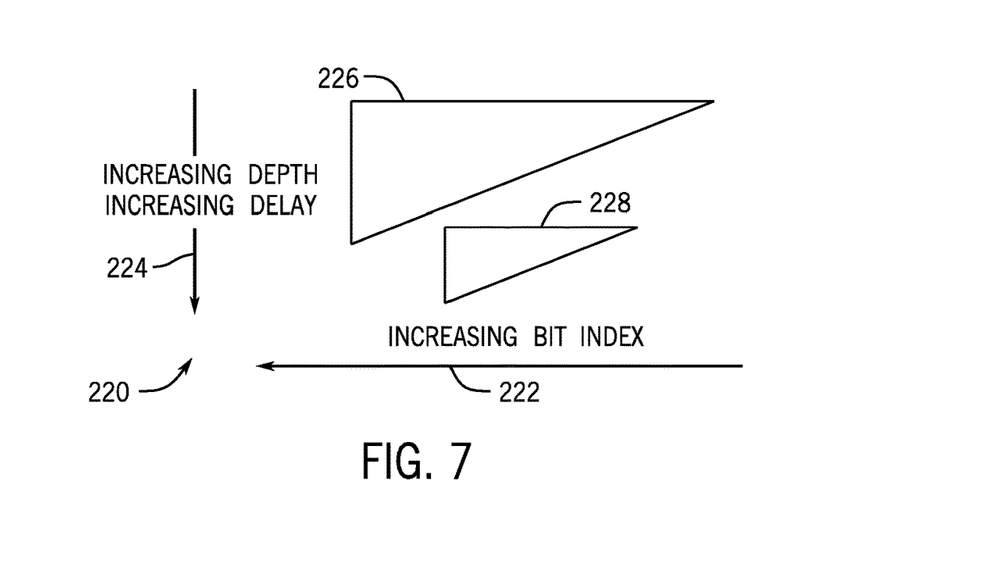
FIG. 7 is a graph illustrating a delay profile of a Brent-Kung propagation network that may be used in the floating-point multiplier of FIG. 6, in accordance with an embodiment.

FIG. 7 illustrates a delay profile graph 220 showing why the normalization multiplexer 204 of FIG. 6 is no longer in the critical path. In other words, the normalization multiplexer 204 no longer relies on the slowest output bits of the propagation network 208. In FIG. 4, the floating-point multiplier 120 may operate such that the parallel prefix propagation circuit 122 relies on receiving the result of the normalization multiplexer 104 before the parallel prefix propagation circuit 122 may begin processing, thereby increasing latency in the floating-point multiplier 120. However, in FIG. 6 the most significant bit output may be made available sooner than least some bits from the propagation network 208. As previously stated, FIG. 6 illustrates that the most significant bit output of the propagation network 208 drives both the normalization multiplexer 204 and the exponent adjustment that is followed by exception handling.

In certain propagation networks (e.g., a Brent-Kung network), the middle bits take longer to calculate than the most significant bits. The delay profile for these types of network are shown in FIG. 7. FIG. 7 illustrates the delay profile graph 220. The delay profile graph 220 includes an X-axis 222 that represents greater bit indices on the left side and lower bit indices on the right side. The delay profile graph 220 includes a Y-axis 224 in which increasing depth represents increasing delay. FIG. 7 also illustrates a portion 226 of the propagation network 208 and another portion 228 of the propagation network 208. As can be seen from the positioning of the portion 226 on the X-axis 222 and on the Y-axis 224, bits at the portion 226 experience less delay than bits at the portion 228 that represent the middle bits of the propagation network 208. Since the most significant bit of the propagation network 208 drives the normalization multiplexer 204 and the middle bits of the propagation network 208 generally have the greatest delay, it can be seen that the normalization multiplexer 204 is outside of the critical path.

Figure 8:
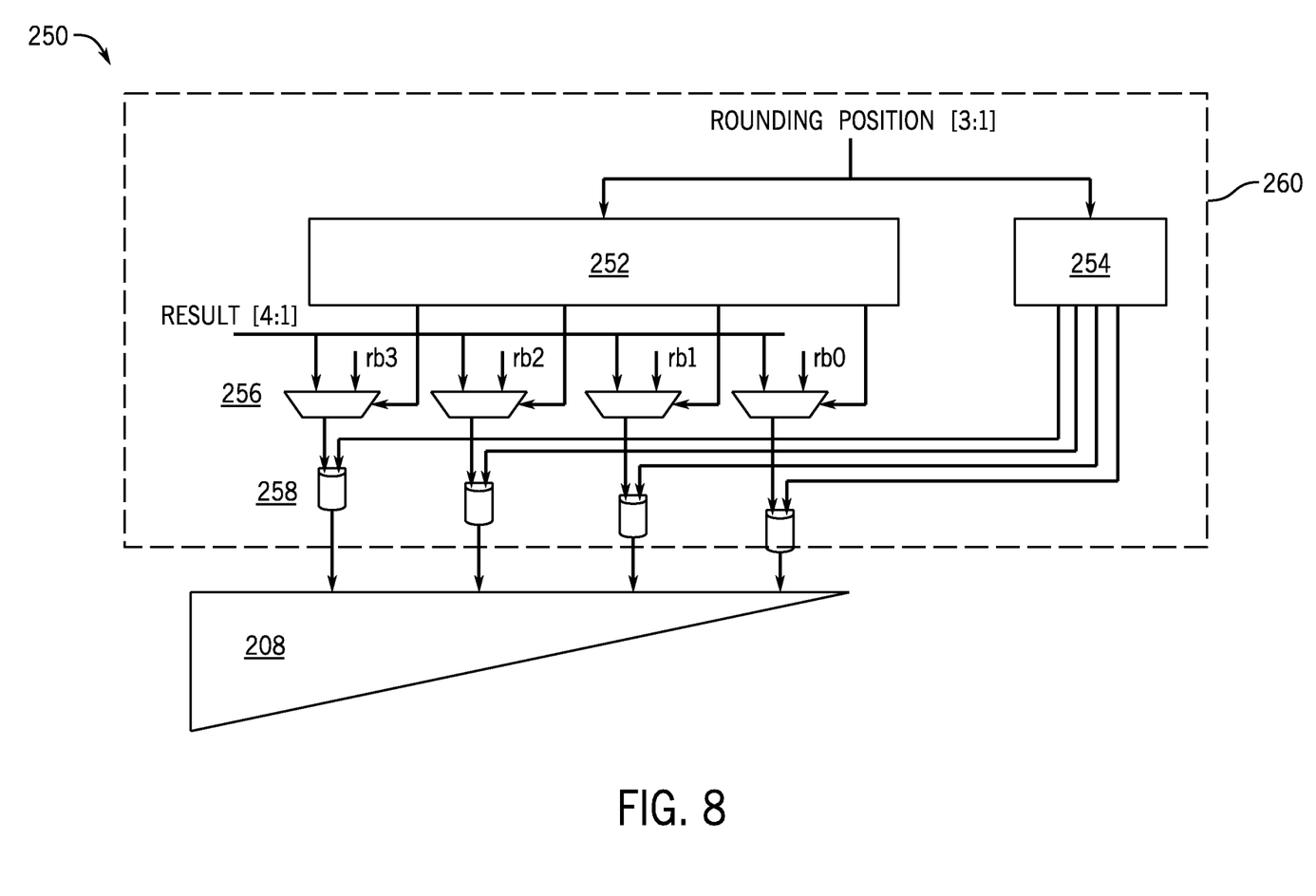
FIG. 8 is a block diagram of a system that performs floating-point rounding operations for performing multiple contiguous rounding points, in accordance with an embodiment.

FIG. 8 shows a block diagram of a system 250 with multiple rounding points. The system 250 includes a one-hot encoder 252, a unary encoder 254, a set of multiplexers 256, a set of OR gates 258, and a propagation network 208. The one-hot encoder 252, the unary encoder 254, the set of multiplexers 256, and the set of OR gates 258 collectively form a rounding circuit 260. The rounding circuit 260 may be an alternative embodiment to the rounding circuit 213 described in FIG. 6. In the rounding circuit 260, when a certain position is chosen by the set of multiplexers 256 to be the rounding position (e.g., position 2), the output of the one-hot encoder 252 sets the chosen bit position to 1 and all other positions to 0. For example, in a 4-bit rounding circuit with rounding at bit position 2, the one-hot encoder 252 would output "0100." For the unary encoder 254, if a position is chosen to be the rounding position (e.g., position 2), the unary encoder 254 would output a 0 for the bit at the rounding position and all bits to the left of the rounding position. The unary encoder 254 also outputs a 1 for all bits to the right of the rounding position. These are cause all OR gates 258 to the right of the rounding position to output a 1 for bits to the right of the bit position. For example, in a 4-bit rounding circuit with rounding position at position 2, the unary encoder 254 output is "0011." As another example, if rounding circuit 260 were a 10-bit position (9:0) rounding circuit with bit 6 as the selected rounding position, the output of the one-hot encoder 252 would be "0001000000," and the output of the unary encoder 254 would be "0000111111." The outputs are then to be injected by the OR gates 258 into the propagation network 208 at corresponding locations (e.g., propagation vector p(i)).

Use of the rounding circuit 260 instead of the rounding circuit 213 enables the normalization multiplexer 204 to be implemented before the propagation network 208. Moving the normalization multiplexer 204 to the output of the propagation network 208 enables the integrated circuit device 12 to multiplex a rounding bit (such as rounding bit 207) between two adjacent positions.

Figure 9:
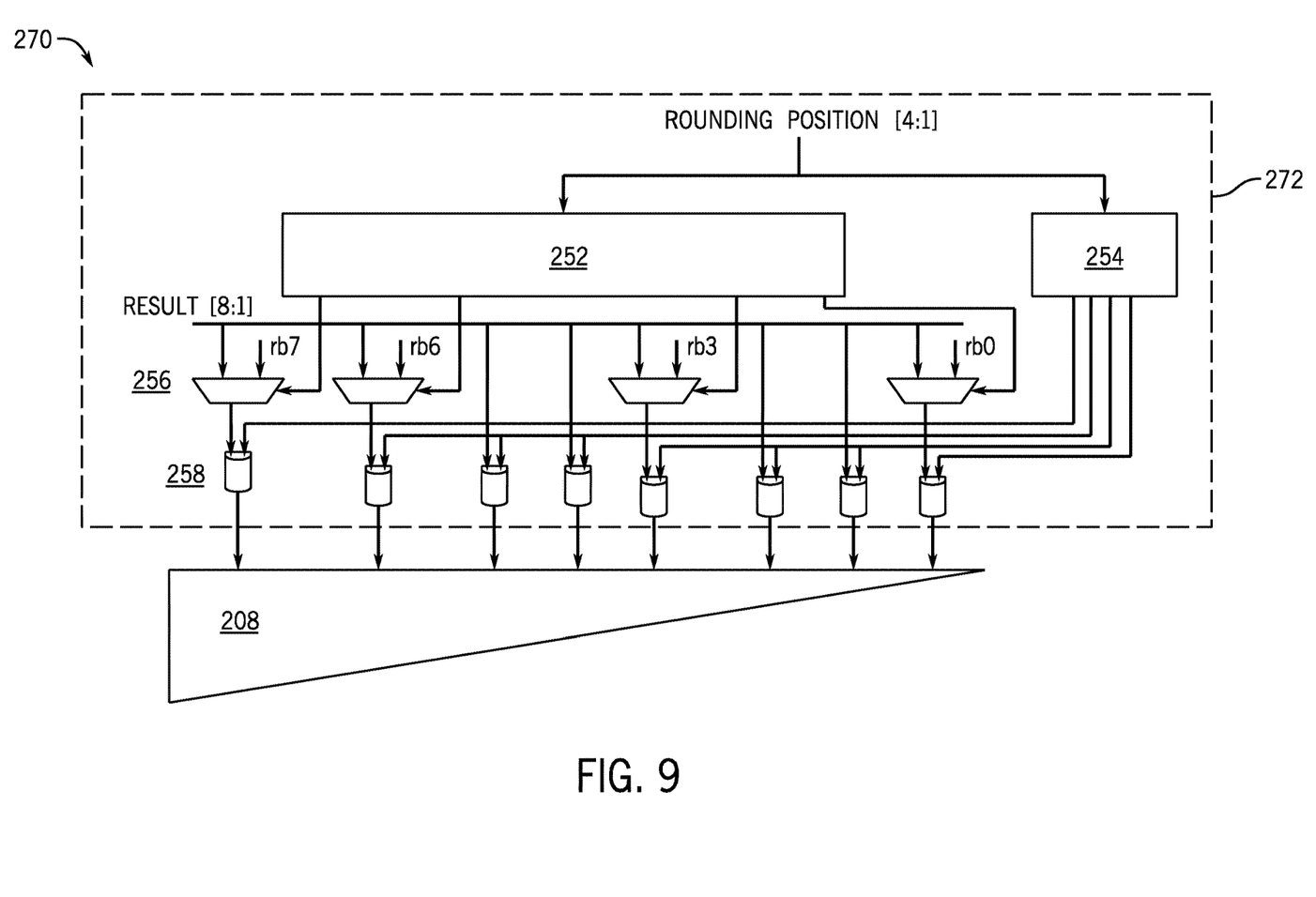
FIG. 9 is a block diagram of a system that implements floating-point arithmetic for multiple non-contiguous rounding points, in accordance with an embodiment.

FIG. 9 is a block diagram of a system 270 with multiple non-contiguous rounding positions. FIG. 9 shows a system 270 having the one-hot encoder 252, the unary encoder 254, the set of multiplexers 256, the set of OR gates 258, and the propagation network 208. The one-hot encoder 252, the unary encoder 254, the set of multiplexers 256, and the set of OR gates 258 collectively form the rounding circuit 272. Although the system 270 in FIG. 9 may contain a rounding circuit 272 of a certain size, one or more bits within the rounding circuit 272 may not be connected to a multiplexer of the set of multiplexers 256, and thus may not be available as a rounding position. For example, if the system 270 were to have an 8-bit rounding circuit 272 (7:0), only four bits may be coupled to a multiplexer of the set of multiplexers 256, and thus be available as rounding bits (e.g., bits 7, 6, 3, and 0 may be the only bits available as rounding locations). In other words, the system enables the use of different rounding locations that are non-contiguous. If, for example, bit 6 were chosen as the rounding position, the unary encoder 254 would trigger all OR gates 258 to the right of bit 6, causing bits to the right of bit 6 (e.g., 5:0) to be set to 1. In this situation, the propagation network 208 may act as if rounding calculations began at bit 6. While this example describes an 8-bit rounding circuit 272 with 4 available rounding positions, it should be noted that other embodiments may include a rounding circuit 272 of any size, with any number of available rounding positions. For example, the multiplexers 256 may be located at certain bit locations frequently used in the mantissa for different formats in a neural network. For instance, the bit locations may be set to 2, 4, 8, 16, 32, or any other suitable location (e.g., any number that is derived using $2^n$).

The embodiments shown in FIGS. 3-9 may be implemented on a number of integrated circuit devices, such as the integrated circuit device 12 described in FIG. 2. Integrated circuit device 12 in FIG. 2 may be an ASIC or FPGA. The integrated circuit device 12 may be, or may be a component of, a data processing system, such as the data processing system 300, shown in FIG. 10. The data processing system 300 may include a host processor 302, memory and/or storage circuitry 304, and a network interface 306. The data processing system 300 may include more or fewer components (e.g., electronic display, user interface structures, or ASICs). The host processor 302 may include any suitable processor, such as an INTEL® Xeon® processor or a reduced-instruction processor (e.g., a reduced instruction set computer (RISC), or an Advanced RISC Machine (ARM) processor) that may manage a data processing request for the data processing system 300 (e.g., to perform machine learning, video processing, voice recognition, image recognition, data compression, database search ranking, bioinformatics, network security pattern identification, spatial navigation, or the like). The memory and/or storage circuitry 304 may include random access memory (RAM), read-only memory (ROM), one or more hard drives, flash memory, or the like. The memory and/or storage circuitry 304 may hold data to be processed by the data processing system 300. In some cases, the memory and/or storage circuitry 304 may also store configuration programs (bitstreams) for programming the integrated circuit device 12. The network interface 306 may allow the data processing system 300 to communicate with other electronic devices. The data processing system 300 may include several different packages or may be contained within a single package on a single package substrate.

Figure 10:
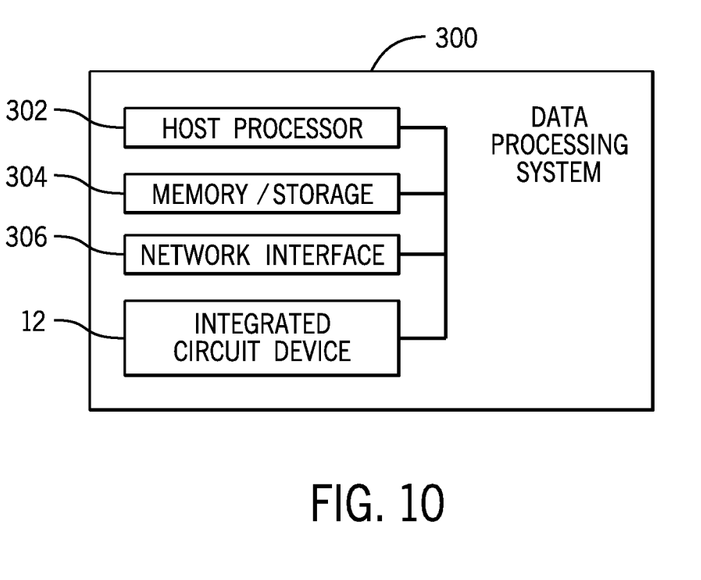
FIG. 10 is a block diagram of a data processing system where one or more floating-point multiplier rounding circuits may be implemented, in accordance with an embodiment.

In one example, the data processing system 300 may be part of a data center that processes a variety of different requests. For instance, the data processing system 300 may receive a data processing request via the network interface 306 to perform machine learning, video processing, voice recognition, image recognition, data compression, database search ranking, bioinformatics, network security pattern identification, spatial navigation, or some other specialized task. The host processor 302 may cause the programmable logic fabric of the integrated circuit device 12 to be programmed with a multiplier suitable to implement a requested task. For instance, the host processor 302 may instruct that a configuration data (bitstream) stored on the memory and/or storage circuitry 304 to be programmed into the programmable logic fabric of the integrated circuit device 12. The configuration data (bitstream) may represent a circuit design set to use one or more floating-point multipliers or other floating-point arithmetic operations that may be mapped to and packed together in the programmable logic according to the techniques described herein. By efficiently mapping and packing the floating-point multipliers, the area, latency, and/or routing resources used to perform the requested task may be reduced on the integrated circuit device 12.

While the embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

EXAMPLE EMBODIMENTS OF THE DISCLOSURE

The following numbered clauses define certain example embodiments of the present disclosure.

Example Embodiment 1

A system comprising:
arithmetic circuitry that generates a floating-point mantissa and comprises:
a propagation network that calculates the floating-point mantissa based on a plurality of input bits; and
rounding circuitry that rounds the floating-point mantissa, wherein the rounding circuitry comprises:
a multiplexer at a rounding location for the floating-point mantissa that selectively inputs a first input bit of the plurality of input bits or a rounding bit; and
an OR gate that ORs a second input bit of the plurality of input bits with the rounding bit, wherein the second input bit is a less significant bit than the first input bit.

Example Embodiment 2

The system of example embodiment 1, wherein the arithmetic circuitry comprises multiplier circuitry comprising:
a first input that receives a first floating-point number; and
a second input that receives a second floating-point number, wherein the arithmetic circuitry generates the floating-point mantissa based at least in part on a multiplication of the first and second floating-point numbers.

Example Embodiment 3

The system of example embodiment 2, wherein the multiplier circuitry comprises an adder that adds one or more values together to generate the plurality of input bits based at least in part on first and second floating-point numbers.

Example Embodiment 4

The system of example embodiment 1, comprising an output multiplexer that receives the floating-point mantissa from the propagation network and normalizes the floating-point mantissa.

Example Embodiment 5

The system of example embodiment 1, wherein the plurality of input bits are based at least in part on an XOR operation on values received at a plurality of XOR gates.

Example Embodiment 6

The system of example embodiment 5, wherein the plurality of input bits comprises:
generate bits generated from the values received at a plurality of AND gates; and
propagation bits generated from the values received at a plurality of OR gates.

Example Embodiment 7

The system of example embodiment 1, wherein the propagation network comprises a parallel prefix propagation circuit.

Example Embodiment 8

The system of example embodiment 1, wherein the rounding circuitry comprises:
- a plurality of additional multiplexers at additional rounding locations for the floating-point mantissa that selectively inputs a respective input bit of the plurality of input bits or a respective rounding bit of a plurality additional rounding bits; and
- a plurality of additional OR gates that ORs a respective input bit of the plurality of input bits with the rounding bit, wherein each of plurality of additional multiplexers correspond to one or more OR gates of the plurality of additional OR gates and a respective additional rounding location of the additional rounding locations, wherein the corresponding one or more OR gates are associated with a less significant bit than the respective additional multiplexer of the plurality of additional multiplexers.

Example Embodiment 9

The system of example embodiment 8, wherein the plurality of additional multiplexers correspond to non-consecutive bits of the plurality of input bits.

Example Embodiment 10

The system of example embodiment 9, wherein a number of the plurality of additional OR gates is greater than a number of the plurality of additional multiplexers.

Example Embodiment 11

A method, comprising:
- receiving two values;
- generating input bits based on respective bit pairs of the two values;
- determining a rounding bit for a result combining the two values;
- transmitting at least some of the inputs bits to a propagation network;
- in the propagation network, generating an output based at least in part on the at least some of the input bits;
- using a rounding multiplexer, selectively transmitting a first input bit of the input bits or a rounding bit at a first location of the propagation network;
- transmitting a second input bit of the input bits to an OR gate along with the rounding bit at a second location of the propagation network, wherein the first location comprises a rounding location and the second location is at a less significant value of the input bits; and
- rounding the output based at least in part on an output of the rounding multiplexer and an output of the OR gate.

Example Embodiment 12

The method of example embodiment 11, wherein generating the input bits comprises XORing the respective bit pairs, ANDing the respective bit pairs, and ORing the respective bit pairs.

Example Embodiment 13

The method of example embodiment 12, wherein the second input bit is a result from ORing a respective bit pair.

Example Embodiment 14

The method of example embodiment 12, wherein the output comprises carry bits.

Example Embodiment 15

The method of example embodiment 14, wherein the carry bits are XORed with respective outputs of the XORing of the respective bit pairs to generate result bits.

Example Embodiment 16

The method of example embodiment 11 comprising normalizing the result bits in an output multiplexer.

Example Embodiment 17

The method of example embodiment 16, wherein normalization in the output multiplexer is based at least in part on an overflow from the propagation network.

Example Embodiment 18

The method of example embodiment 17, wherein the overflow is based on a most significant bit of the propagation network.

Example Embodiment 19

A system comprising:
- arithmetic circuitry that generates a floating-point mantissa and comprises:
  - a propagation network that calculates the floating-point mantissa based on a plurality of input bits; and
  - rounding circuitry that rounds the floating-point mantissa to one of a plurality of rounding locations, wherein the rounding locations correspond to:
    - a respective multiplexer at the respective rounding location for the floating-point mantissa that selectively inputs a first input bit of the plurality of input bits or a rounding bit; and
    - an OR gate that ORs a second input bit of the plurality of input bits with the rounding bit, wherein the second input bit is a less significant bit than the first input bit.

Example Embodiment 20

The system of example embodiment 19 wherein the plurality of rounding locations comprise non-consecutive bits of the plurality of input bits.

What is claimed is:
1. A system comprising:
   arithmetic circuitry to generate a floating-point mantissa, the arithmetic circuitry comprising:
   rounding circuitry, comprising:
   a multiplexer to selectively output a first input bit of a plurality of input bits or a rounding bit, and
   an OR gate to OR a second input bit of the plurality of input bits with the rounding bit, wherein the second input bit is a less significant bit than the first input bit; and
   a propagation network to round the floating-point mantissa based on the plurality of input bits, an output of the multiplexer, and an output of the OR gate, wherein the output of the multiplexer is provided to the propagation network at a rounding location for the floating-point mantissa.

2. The system of claim 1, wherein the arithmetic circuitry further comprises multiplier circuitry, the multiplier circuitry to:
receive a first floating-point number; and
receive a second floating-point number,
wherein the floating-point mantissa is generated based at least in part on a multiplication of the first and second floating-point numbers.

3. The system of claim 2, wherein the multiplier circuitry comprises an adder that is to generate the plurality of input bits based at least in part on the first floating-point number and the second floating-point number.

4. The system of claim 1, further comprising an output multiplexer, the output multiplexer to receive the floating-point mantissa from the propagation network and to normalize the floating-point mantissa.

5. The system of claim 1, wherein the plurality of input bits is generated based at least in part on an XOR operation on values received at a plurality of XOR gates.

6. The system of claim 1, wherein the plurality of input bits comprises:
generate bits generated from values received at a plurality of AND gates; and
propagation bits generated from values received at a plurality of OR gates.

7. The system of claim 1, wherein the propagation network comprises a parallel prefix propagation circuit.

8. The system of claim 1, wherein the rounding circuitry further comprises:
a plurality of additional multiplexers at additional rounding locations for the floating-point mantissa, an additional multiplexer to selectively output a respective input bit of the plurality of input bits or a respective rounding bit of a plurality additional rounding bits; and
a plurality of additional OR gates, an additional OR gate to OR a respective input bit of the plurality of input bits with the rounding bit,
wherein a respective additional multiplexer of the plurality of additional multiplexers corresponds to one or more additional OR gates of the plurality of additional OR gates and a respective additional rounding location of the additional rounding locations, and the one or more additional OR gates are associated with a less significant bit than the respective additional multiplexer of the plurality of additional multiplexers.

9. The system of claim 8, wherein the plurality of additional multiplexers corresponds to non-consecutive bits of the plurality of input bits.

10. The system of claim 9, wherein a number of the plurality of additional OR gates is greater than a number of the plurality of additional multiplexers.

11. A method, comprising:
receiving two values;
generating input bits based on respective bit pairs of the two values;
determining a rounding bit for a result combining the two values;
transmitting at least some of the inputs bits to a propagation network;
generating an output based at least in part on the at least some of the input bits;
transmitting an output of a rounding multiplexer to the propagation network at a first location, wherein the first location comprises a rounding location, and the output of the rounding multiplexer comprises a first input bit of the input bits or a rounding bit;
transmitting a second input bit of the input bits and the rounding bit to an OR gate;
transmitting an output of the OR gate to the propagation network at a second location, wherein the second location corresponds to a less significant value of the input bits; and
rounding the output based at least in part on the output of the rounding multiplexer and the output of the OR gate.

12. The method of claim 11, wherein generating the input bits comprises XORing the respective bit pairs, ANDing the respective bit pairs, and ORing the respective bit pairs.

13. The method of claim 12, wherein the second input bit is a result from ORing a respective bit pair.

14. The method of claim 12, wherein the output comprises carry bits.

15. The method of claim 14, wherein the carry bits are XORed with respective outputs of the XORing of the respective bit pairs to generate result bits.

16. The method of claim 15, further comprising normalizing the result bits in an output multiplexer.

17. The method of claim 16, wherein normalization in the output multiplexer is based at least in part on an overflow from the propagation network.

18. The method of claim 17, wherein the overflow is based on a most significant bit of an output of the propagation network.

19. A system comprising:
arithmetic circuitry to generate a floating-point mantissa, the arithmetic circuitry comprising:
rounding circuitry, comprising:
a respective multiplexer to selectively output a first input bit of a plurality of input bits or a rounding bit, and
an OR gate to OR a second input bit of the plurality of input bits with the rounding bit, wherein the second input bit is a less significant bit than the first input bit; and
a propagation network to round the floating-point mantissa at a plurality of rounding locations for the floating-point mantissa,
wherein an output of the respective multiplexer is provided to the propagation network at a respective rounding location of the plurality of rounding locations, and the propagation network is to round the floating-point mantissa at the respective rounding location based on the plurality of input bits, the output of the respective multiplexer, and an output of the OR gate.

20. The system of claim 19 wherein the plurality of rounding locations corresponds to non-consecutive bits of the plurality of input bits.

* * * * *

UNITED STATES PATENT AND TRADEMARK OFFICE
CERTIFICATE OF CORRECTION

PATENT NO. : 12,020,000 B2
APPLICATION NO. : 17/133861
DATED : June 25, 2024
INVENTOR(S) : Martin Langhammer et al.

It is certified that error appears in the above-identified patent and that said Letters Patent is hereby corrected as shown below:

In the Claims

In Column 14, Claim 11, Line 1, delete "inputs bits" and insert -- input bits --, therefor.

In Column 14, Claim 20, Line 57, delete "claim 19" and insert -- claim 19, --, therefor.

Signed and Sealed this
Thirtieth Day of July, 2024

Katherine Kelly Vidal
*Director of the United States Patent and Trademark Office*